June 28, 1932.  G. WALTHER  1,864,701
METAL WHEEL
Filed Jan. 26, 1925
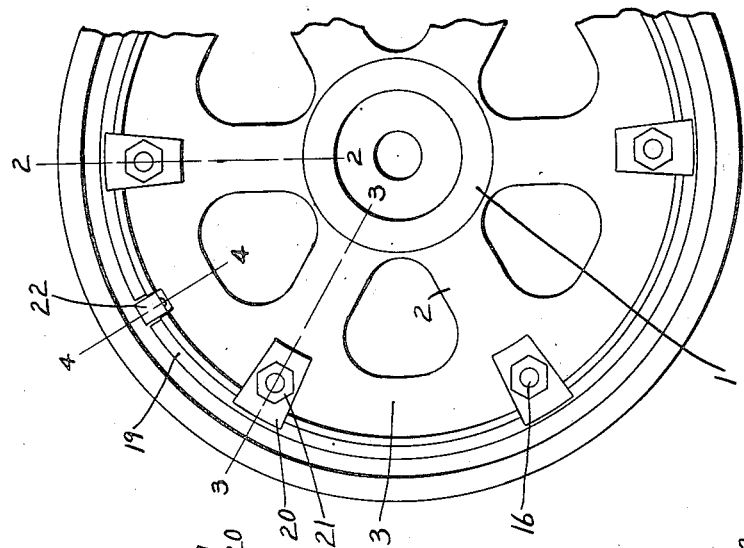
FIG. 1
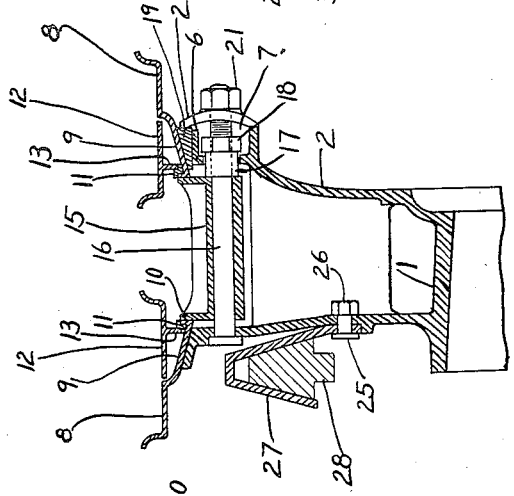
FIG. 2
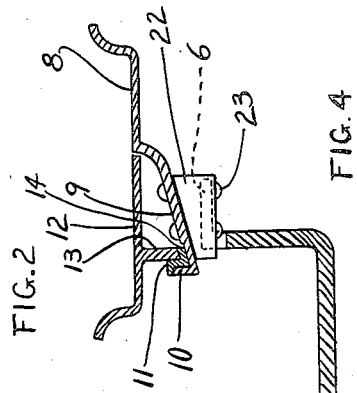
FIG. 4
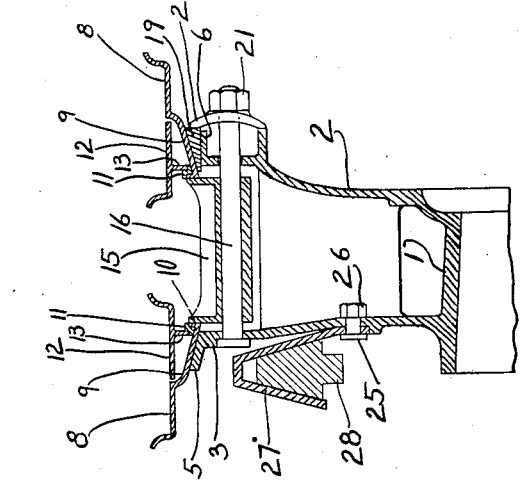
FIG. 3
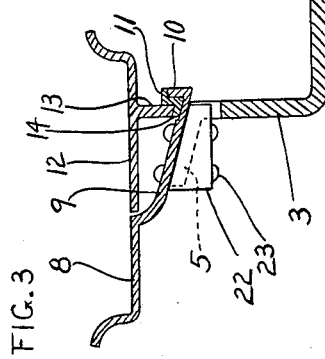
INVENTOR,
George Walther
BY
Howard P. Smith
ATTORNEY Patented June 28, 1932

1,864,701

UNITED STATES PATENT OFFICE

GEORGE WALTHER, OF MONTGOMERY COUNTY, NEAR DAYTON, OHIO, ASSIGNOR TO THE DAYTON STEEL FOUNDRY COMPANY, OF DAYTON, OHIO, A CORPORATION OF OHIO

METAL WHEEL

Application filed January 26, 1925. Serial No. 4,782.

This invention relates to new and useful improvements in metal wheels.

It is one of the principal objects of my invention to provide a neat appearing, light and compact metal wheel for truck and passenger automobile use.

It is another object of my invention to place the split locking ring in a concealed position in an inner pocket or recess created by the beveled part of the tire rim, thereby obviating the necessity of making the wheel wider to receive it. A lighter wheel therefore results.

It is a further object of my invention to provide a dual pneumatic wheel in which each tire rim is formed in two sections to make easier the removal of the tire by dividing the frictional resistance thereto, since it is easier to separate two sections of a tire rim from a tire that has rusted thereon, than a tire rim which has been made in a single piece.

It is a further object of my invention to provide for metal wheels, a brake drum which is concave or substantially V shape in cross section to increase its friction surface without extending the drum laterally. This results in a lighter and more compact brake drum, and one which is especially adapted for passenger cars.

Other important and incidental objects will be brought out in the following specification and particularly set forth in the subjoined claims.

In the accompanying drawing, Figure 1 is a front view of my dual pneumatic spoke type of metal wheel. Figure 2 is a radial section taken therethrough on the line 2—2 of Figure 1, showing the split locking rings in the recesses which the beveled parts of the outer tire rim sections provide for them. Figure 3 is a radial section taken through my improved spoke metal wheel on the line 3—3 of Figure 1. And Figure 4 is a radial section taken through the wheel on the line 4—4 of Figure 1, showing the drivers at the beveled portions of the tire rims.

The accompanying drawing illustrates a metal wheel which is preferably constructed of steel and formed with a hub 1, integral spokes 2 and an integral recessed or channeled felloe 3. The inner wall of the felloe terminates at its outer end in a beveled portion 5, while its outer wall is formed with a substantially flat top 6 and a series of lateral recesses 7.

The numerals 8, 8 designate two outer rim sections which are constructed with the quality of lightness in view. Each outer rim section 8 has an outer flange, a flat central portion and an inclined or beveled inner part 9. The latter terminates at its extreme inner end in an outwardly turned shoulder 10. Adjacent the latter the outer tire rim section 8 is formed with an annular recess to receive a split locking ring 11 of less width than the recess. This recess in the beveled part 9 of the outer rim sections 8, 8 forms a convenient pocket to receive and conceal the split locking ring 11 which it might otherwise be necessary to support by making the rim wider. A material saving in metal thus results by placing this locking ring in the recessed portion of the beveled part of each outer tire rim section to make the wheel lighter.

The numerals 12, 12 designate two inner tire rim sections, each of which has a flat portion and a curved end flange. Projecting inwardly from the bottom surface of each inner tire rim section 12, at right angles to its flat part, is a flange 13. This flange projects inwardly from the tire rim section 12 at a point which permits it to rest upon an annular ledge 14 formed around the outer part of the split locking rings 11, 11.

A rubber tire supported by each one of these sectional rims just described may be more easily removed than in those instances where the rim is a single member. In other words, it is easier to take the rim off in pieces than in one piece, since in a two piece tire rim structure such as I have provided, the frictional resistance to the removal of the tire from it is divided. The outer tire rim sections 8, 8 are always constant in width, while the width of the inner sections 12, 12 may be varied to suit different conditions of use.

The numeral 15 designates a spacing bushing or sleeve which flares outwardly at each end. There are a number of these bushings held at uniform distances apart around the wheel in the annular recessed portion of the felloe 3 by bolts 16 which pass through them. The heads of these bolts are anchored against the inner wall of the felloe, and through holes in this inner wall these bolts 16 pass into and through the bushings 15. Thence these bolts 16 project through short bushings 17 which pass into the recesses 7 in the outer wall of the felloe so that nuts 18, convenient for turning, may be applied to them.

After a tire is mounted on the inner sectional rim, the bushings or sleeves 15 are pressed tightly against the annular shoulder 10 on the outer tire rim section 8 by turning the nuts 18. The inner sectional tire rim may thus be held solidly on the bevelled part 5 of the inner wall of the felloe 3 while the outer tire is being applied or removed.

The beveled part 9 of the outer tire rim section 8 is engaged by a wedge ring 19 which is pressed between said beveled part of the tire rim section and the top 6 of the outer wall of the felloe 3 by curved clamps 20. These clamps are mounted on the extended ends of the bolts 16 which receive on their outer ends nuts 21. By the latter the clamps 20 are pressed firmly against the wedge ring 19 to force it snugly between the beveled part 9 of the outer tire rim section 8 and the top of the outer wall of the felloe 3. And through the pressure which the outer tire rim section 8 will then exert upon the bushings 15, the latter will press against the shoulder 10 on the opposite tire rim section 8 to force the latter firmly against the beveled part 5 on the inner wall of the felloe. On each side of the wheel the split locking ring 11, which is substantially Z shape in cross section, will be firmly supported at its top by the shoulder 10 and at its bottom by the beveled part 9 of the outer tire rim section 8 to solidly support the flange 13 on the inner tire rim section 12.

Between the ends of the split wedge ring 19 on each side of the wheel, a driver 22 connected by rivets 23 to the beveled part of the outer tire rim section 8, is inserted in a slot formed in the felloe wall to prevent the tire rim from slipping around the felloe. (See Figures 1 and 4.)

Secured by bolts 25 and nuts 26 to the inner parts of the hollow spokes 2 of the wheel, is a brake drum 27. The latter is deeply recessed, and in this instance turned to substantially V shape in cross section, to present a large friction surface to a brake shoe 28. An increased braking surface is thus created without extending the brake drum laterally. It also makes the brake drum lighter and more compact.

Having described my invention, I claim:

1. A metal wheel including a felloe formed with an inner wall and an outer wall between which there is an annular channel, the inner wall having an inwardly beveled periphery, a tire rim having an inwardly beveled portion wholly supported on the beveled periphery of the inner felloe wall, bolts in said annular channel, sleeves on said bolts, and nuts on the bolts for pressing the sleeves against the tire rim to force it solidly against the beveled periphery of the inner wall of the felloe.

2. A metal wheel including a felloe formed with an inner wall and an outer wall between which there is an annular peripheral channel, the inner wall of the felloe having an inwardly beveled periphery, a tire rim having an inwardly beveled portion mounted on the beveled part of the inner felloe wall, transverse bolts in the peripheral channel portion of the felloe around the latter, sleeves mounted on said bolts adapted at their inner ends to engage the inner tire rim, recesses formed in the outer wall of the felloe into which said bolts project, nuts in said recesses on the bolts, an outer tire rim having a beveled part in engagement with said sleeves, a wedge ring between the felloe and the beveled part of the outer tire rim, clamps on said bolts beyond the nuts to engage the wedge ring, and nuts on the extreme outer ends of said bolts to press said clamps against the wedge ring for the purpose specified.

3. In a dual rim and wheel structure, inner and outer seats on the wheel, an outer rim supported on the outer seat, an inner rim supported on the inner seat, a series of clamping devices, including spacing members, securing the inner rim to the wheel independently of the outer rim, and means clamping the outer rim against the outer side of said spacing members.

In testimony whereof I have hereunto set my hand this 23rd day of January, 1925.

GEORGE WALTHER.